United States Patent [19]

Way et al.

[11] 4,000,946
[45] Jan. 4, 1977

[54] STEPPER MOTOR TRACKING ACCURACY CONTROL FOR SPECTROPHOTOMETERS

[75] Inventors: Allan S. Way, Irvine; Stanley L. Pratt, Riverside, both of Calif.

[73] Assignee: Beckman Instruments, Inc., Fullerton, Calif.

[22] Filed: Nov. 20, 1975

[21] Appl. No.: 633,512

Related U.S. Application Data

[63] Continuation of Ser. No. 433,396, Jan. 14, 1974, abandoned.

[52] U.S. Cl. .............................. 356/89; 356/95; 356/97
[51] Int. Cl.$^2$ .................. G01J 3/06; G01J 3/42
[58] Field of Search ............... 356/89, 93, 95, 96, 356/97, 100, 101

[56] References Cited

UNITED STATES PATENTS

| | | | |
|---|---|---|---|
| 3,176,576 | 4/1965 | Sundstrom et al. | 356/89 |
| 3,455,636 | 7/1969 | Haswell | 356/93 X |
| 3,563,656 | 2/1971 | Helms | 356/100 X |

*Primary Examiner*—John K. Corbin
*Assistant Examiner*—F. L. Evans
*Attorney, Agent, or Firm*—R. J. Steinmeyer; R. R. Meads

[57] ABSTRACT

A tracking accuracy control system for a spectrophotometer utilizing stepper motors for controlling the wavelength drive and chart drive system. An exact ratio between the wavelength drive motor and chart drive motor is maintained under variable speed conditions by utilizing an error signal which normally operates the reference beam attenuator, this error signal being transmitted through an absolute value circuit to produce a voltage whose magnitude is the absolute value of the error signal. This absolute value is then transmitted through a fast attack, slow release hold-over circuit to control a voltage controlled oscillator in such a way as to reduce wavelength scan speed in an amount proportional to the error while simultaneously controlling chart speed in an exact ratio to the scan speed. The output of the voltage controlled oscillator is a pulse train having a frequency proportional to the magnitude of the absolute value of error signal.

4 Claims, 3 Drawing Figures

STEPPER MOTOR TRACKING ACCURACY CONTROL FOR SPECTROPHOTOMETERS

This is a continuation of application Ser. No. 433,396, filed Jan. 14, 1974, now abandoned.

BACKGROUND OF THE INVENTION

This invention relates to analyzers of the double beam, optical null type such as spectrophotometers utilizing beam intensity balancing, and in particular, to spectrophotometers having recording chart drive systems.

In analyzers of this type, radiation from a source is switched along a reference beam path and a sample beam path, the two beams being modulated and recombined at a thermocouple or other electrical signal generator. A sample to be analyzed is placed in one path and an error signal is used to drive a servo which varies the intensity of the beam in the reference path to achieve a null or zero signal at the thermocouple. The servo position is a measure of the sample content. Ordinarily, the wavelength of the radiation source is scanned over a range by a monochromator during the measurement to provide a spectrum measure of the sample. This spectrum is plotted on a chart which can have either a fixed chart with a pen moving along an X-Y axis of the chart or a moving chart having the pen traversing one axis of the chart along a fixed line.

In either type of recording under closed loop servo conditions the wavelength scan speed is controlled according to the speed of response of the instrument dynamics which places the beam attenuator such as a comb into the reference beam path, thus resulting in variable speed of the wavelength scanner according to instrument dynamics. Since the chart or pen speed must be controlled in proportion to the wavelength scan speed, prior art systems have utilized a single variable speed motor with mechanical gearing to both the wavelength drive and chart drive to maintain the ratio. Due to the lash or play in the mechanical gearing and further depending upon the amount of gearing necessary due to physical placement of the wavelength drive and chart drive, precise tracking control is virtually impossible to obtain.

SUMMARY OF THE INVENTION

Accordingly, it is an object of the invention to provide a new and improved spectrophotometer utilizing a voltage controlled oscillator to drive both a chart drive stepper motor and a wavelength scan speed stepper motor.

It is another object of this invention to provide a new and improved tracking accuracy control utilizing a voltage controlled oscillator to simultaneously control the wavelength motor through wavelength dividers and a chart motor through chart dividers to maintain an exact ratio between the speed under variable speed conditions.

The foregoing and other objects of the invention are accomplished by having an optical null spectrophotometer with a recording chart print-out with both the wavelength motor and the chart drive motor being stepper motors simultaneously controlled by a voltage controlled oscillator, the output of which provides a pulse train at a frequency determined by the voltage controlled oscillator input. The voltage controlled oscillator input is an absolute value error signal derived from the error signal utilized to control the position of the reference beam attenuator. The voltage controlled oscillator provides switch selectable fixed frequency in combination with independent voltage controlled frequency.

The novel features which are believed to be characteristic of the invention are set forth with particularity in the specification which can best be understood by reference to the following description and accompanying drawings.

DESCRIPTION OF THE PREFERRED EMBODIMENT

Figure 1:
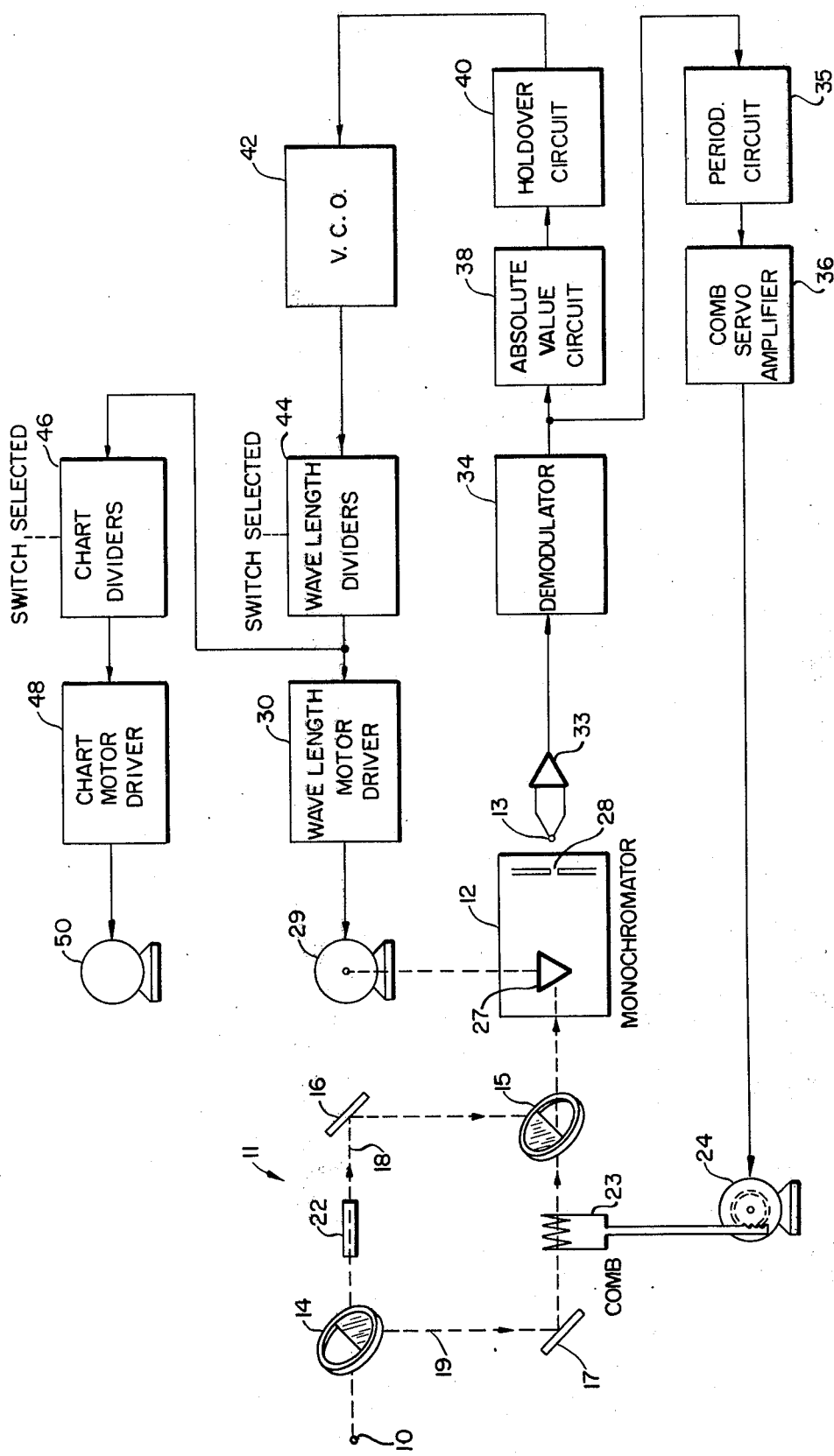
FIG. 1 is a block diagram of a spectrophotometer utilizing a stepper motor tracking accuracy control.

Referring now to the drawing, and particularly to FIG. 1, the apparatus includes a source 10, a beam switching system 11, a monochromator 12 and a thermocouple 13. The source 10 may be any suitable device which produces radiation over the spectrum being analyzed. The beam switching system includes half mirrors 14, 15 which are rotated in synchronism, and reflecting mirrors 16, 17, providing a sample beam path 18 and a reference beam path 19. A sample cell 22 is positioned in the sample beam path 18 for containing the sample to be analyzed. Means for varying the intensity of the beam along the reference beam path 19 is positioned therein. A typical example is the comb 23 which is driven into and out of the reference beam path by a motor 24.

The monochromator 12 includes means for dispersing the beam passing therethrough, shown here as a prism 27, and a slit 28 which permits only a small fraction of the dispersed beam to impinge on the thermocouple 13. The prism 27 is rotated by a scan motor 29 during the analysis to scan the entire spectrum of interest past the slit 28. The scan motor 29 employed in this embodiment is a stepper motor which is rotated by means of discrete digital pulses, the speed being dependent on the frequency of the pulses. The motor 29 is energized from a wavelength motor driver 30 which is ordinarily set to operate the motor at a constant rate. A programmed change in scan speed over the spectrum is usually desired and is conventionally accomplished by coupling the motor to the prism or other dispersing element by means of a cam of appropriate contour.

The thermocouple 13 produces an electrical error signal proportional to the difference in intensity of the beams traversing the sample path and reference path with the error signal cyclically varying at the beam switching rate, which ordinarily is in the range of 5 to 20 cycles per second.

The error signal from the thermocouple 13 is connected to an amplifier 33, a demodulator 34, a period circuit 35 and an amplifier 36. With the exception of the stepper motor being employed as the scan motor 29 the system thus far described is conventional. A system of this type is shown and described in U.S. Pat. No. 3,176,576. The output of the amplifier 36 drives the comb motor 24, with the amplifier and motor functioning as the comb servo. The demodulator 34 is operated in synchronism with the beam switching system and converts the a.c. error signal to d.c. Various types of demodulators may be used with the mechanical chopper or switch beam preferred at the relatively low frequencies ordinarily encountered in such instruments. The period circuit 35 is a low pass filter that limits the response rate of the comb servo and reduces the sensitivity of the instrument to sharp transients in the error signal such as are ordinarily produced by noise. The time constant of the period circuit is selected as a compromise between the maximum response rate of the comb servo and the acceptable noise level and typically is in the range of ¼ to 16 seconds. The simplest form of period circuit which is used in many instruments, is a resistance-capacitance filter section comprising a series resistor and a shunt capacitor.

It would be desirable in the operation of spectrophotometers to have the scan motor 29 run at a high speed and to omit the period circuit so that a complete spectrum analysis could be completed in a relatively short time with a high degree of accuracy in the recorded output. However, the presence of noise ordinarily requires the period circuit, which reduces the response rate of the comb servo. Then when large error signals are generated the comb servo lags behind the scan system and errors occur in the recorded output, these errors ordinarily being identified as errors in tracking accuracy. One method of improving the tracking accuracy is to reduce or suppress the scan motor speed during the existence of large error signals so that the comb servo with its limited response rate can accurately follow the error signals. It has also been found that the tracking accuracy can also be improved by controlling the time constant of a period circuit with the time constant being reduced during conditions of large error signals so that the response rate of the comb servo increases and permits rapid and accurate operation of the nulling system. The particular method of tracking accuracy control heretofore employed was dependent upon the scanning speed of the instrument. At a relatively high scanning speed the speed suppression or reduction approach for improving the tracking accuracy was preferred since, at high scanning speeds, the time constant of the period circuit will be relatively short. Alternatively, with the instrument being operated at a relatively low speed and with a relatively long period or large time constant, the period suppression or time constant control was preferred so as not to unduly extend the analysis time.

The diagram of FIG. 1 shows a system which utilizes scan speed suppression operable over a wide range of scanning speeds. The demodulated error signal appearing at the output of demodulator 34 is a comb servo error signal which is a voltage whose magnitude and polarity are determined by the difference between the desired comb position and actual comb position. This output is transmitted into an absolute value circuit 38 to produce a voltage whose magnitude is determined by the absolute value of the error signal. This value is ordinarily above the minimal acceptable error level, which minimal error level is necessary for proper functioning of a servo system. The output of absolute value circuit 38 is then transmitted into a hold-over circuit 40 which is a fast attack slow release circuit, the attack time of which must be much less than the instrument period and the release time of which should be greater than the instrument period. The output of the hold-over circuit 40 controls the voltage controlled oscillator 42 in such a way as to reduce scan speed in an amount proportional to the error appearing at the output of demodulator 34. By providing a sufficient dynamic range for the voltage controlled oscillator 42, the result is an instrument whose scan speed is controlled by the characteristics of the sample 22. This provides a spectrum analysis with both error and scan time minimized for every sample.

The output of the voltage controlled oscillator 42 is a pulse train, the frequency of which is proportional to the absolute value of the error signal. The output frequency is divided by switch selectable wavelength dividers 44 to produce a pulse train of suitable frequency for the desired scan speed to the wavelength motor driver 30 and to the chart dividers 46 which controls the chart motor driver 48 which in turn drives the chart stepper motor 50.

The chart frequency dividers 46 are similarly switch-selectable as are the wavelength frequency dividers 44. While the stepper motor 50 is herein described as relating to the chart speed of a moving chart passing a recording pen traversing a given line, it is also to be understood that the stepper motor 50 can be employed to move a pen mechanism along one axis with respect to a fixed chart. In either event the principles remain the same, resulting in the elimination of any mechanical connection between wavelength and chart drives while maintaining the exact ratio between the speeds under variable speed conditions by use of the voltage controlled oscillator 42.

The switch selected wavelength dividers 44 and the switch selected chart dividers 46 can be manually selected by an operator to a desired scan speed and chart speed based on the results anticipated of a given sample.

As previously stated, the output of the demodulator 34 is a comb servo error signal having a magnitude and polarity determined by the difference between the desired comb position and the actual comb position. This signal is then converted by the absolute value of circuit 38 to an absolute magnitude in a conventional manner. The triggering of the absolute value circuit is set up at a minimal level of error desired, and when this level is exceeded, the excess absolute value error signal is transmitted to the hold-over circuit 40.

Figure 2:
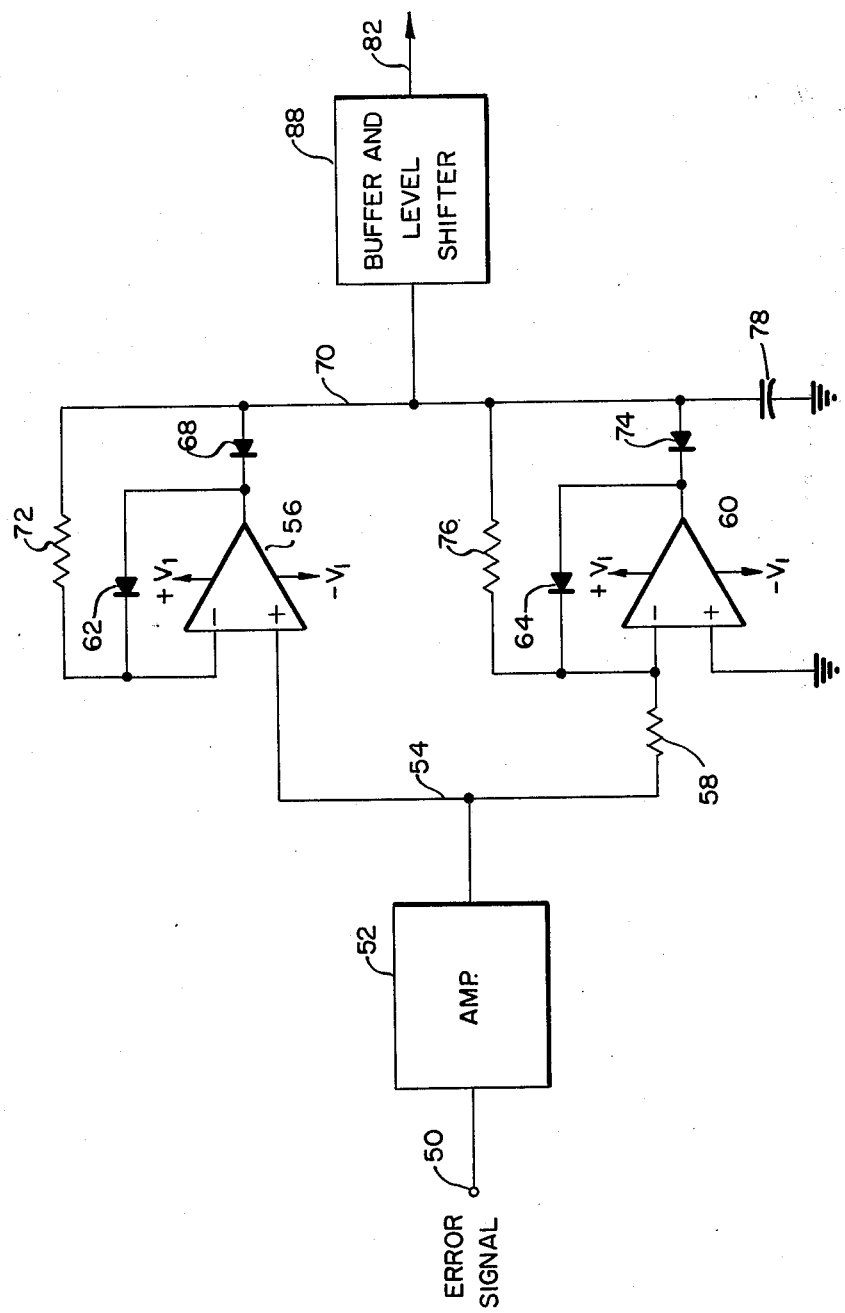
FIG. 2 is a schematic diagram of the absolute value detector and hold-over circuit utilized in the system of FIG. 1.

In the physical apparatus of the embodiment the hold-over circuit is combined with the absolute value circuit 38 and as shown in FIG. 2 the error signal at input 50 is the output of demodulator 34. This signal is amplified in amplifier 52 and suitably transmitted over leads 54 to the non-inverting input of operational amplifier 56 and through resistor 58 to the inverting input of a second operational amplifier 60. The non-inverting input of operational amplifier 60 is grounded. Diodes 62 and 64, respectively, are provided from the output to the inverting inputs of amplifiers 56 and 60, respectively. The output of amplifier 56 is connected to the cathode of diode 68 which has the anode thereof connected to an output lead 70, the lead 70 also being connected through resistor 72 back to the inverting input of amplifier 56. Similarly, connected in circuit with amplifier 60 are diodes 74 and resistor 76. The lead 70 has one end thereof connected to a hold-over capacitor 78, the other end of which is connected to ground. The output lead 70 is connected to the input of a buffer and level shifter circuit 80 of conventional design to provide the output to the voltage controlled oscillator 42 on lead 82.

Depending on the polarity of the error signal appearing at input lead 50, either one or the other of operational amplifiers 56 will provide a charge path for capacitor 78 through either diode 68 or 74, respectively, depending on which diode is forward biased. Due to the low impedance provided in the charge path by the diode, the capacitor 78 will charge rapidly to provide a negative voltage on lead 70 which is always at a zero or negative voltage value. In this manner an error is immediately detected to charge the capacitor to slow the scan speed. Resistors 72 and 76 provide the discharge path for the capacitor 78, these resistors being high resistance values (approximately 100 K ohms). Once the capacitor is fully charged in accordance with the error signal, the operational amplifier is de-energized, thereby permitting the discharge of capacitor 78 slowly through either resistors 72 or 76. This provides the slow release previously referred to, to control the system as zero error is approached. The output appearing on lead 82 is transferred to the voltage controlled oscillator 42.

Figure 3:
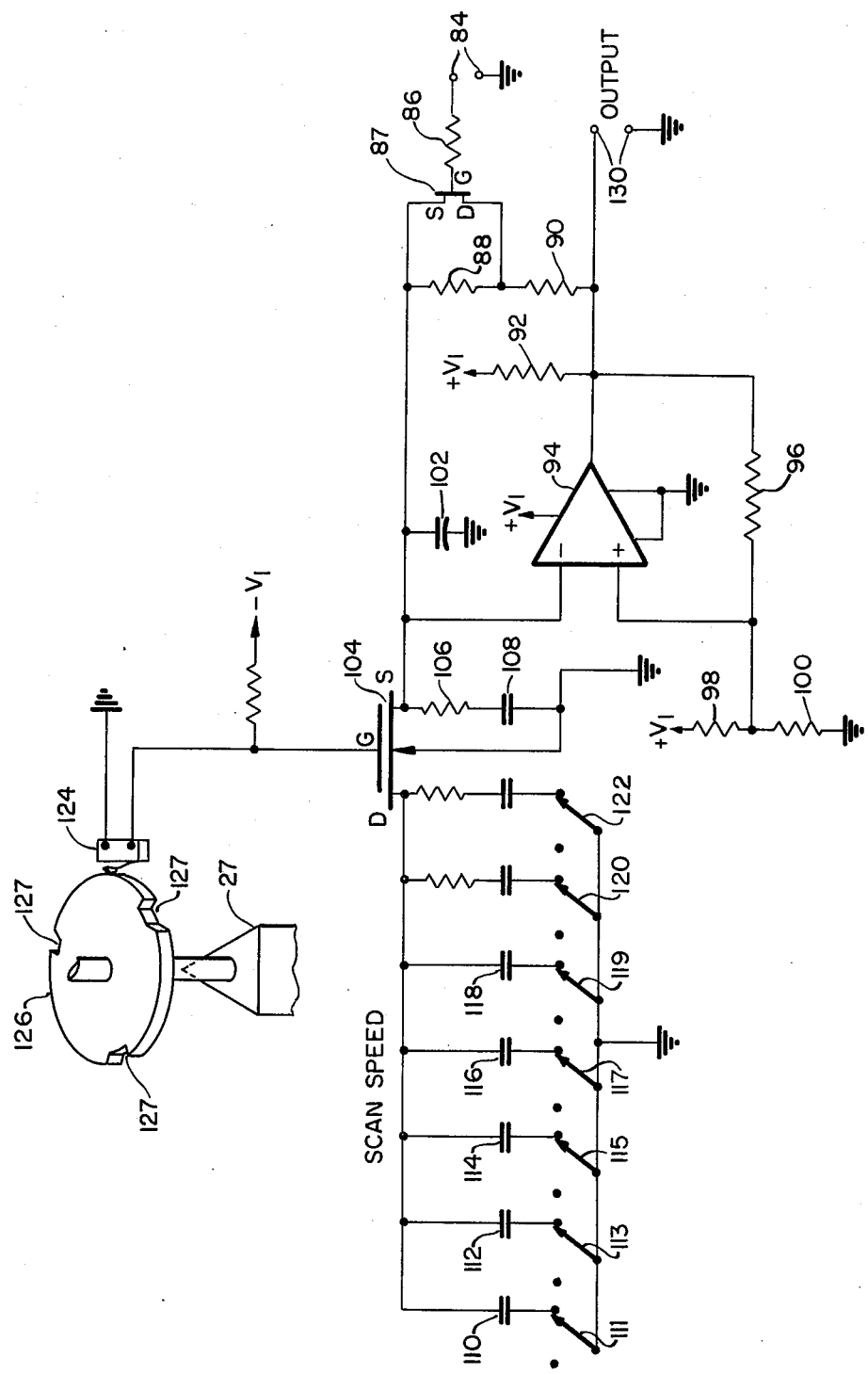
FIG. 3 is a schematic diagram of a voltage controlled oscillator utilized in the system of FIG. 1.

As seen in FIG. 3, input leads 84 receive the output of the hold-over circuit appearing on lead 82 (FIG. 2). This input is transferred through resistor 86 to the gate terminal of a junction field-effect transistor 87 which has a resistor 88 connected between the source and drain terminals thereof. The drain terminal is also coupled through resistor 90 through resistor 92 to a positive source of voltage $+V_1$. The intermediate terminal between resistors 90 and 92 is connected to the output of amplifier 94, the output also being coupled through feedback resistor 96 to the noninverting terminal thereof. The noninverting terminal of operational amplifier 94 is connected to the intermediate point between resistors 98 and 100, the other end of resistor 98 being connected to a positive voltage source $+V_1$ with the other end of resistor 100 being connected to ground. The source terminal of transistor 87 is connected to one end of a capacitor 102, the other end of which is coupled to ground, the source terminal also being coupled to the source terminal of an insulated gate field-effect transistor 104 as well as the inverting input of amplifier 94. Connected between the source terminal of transistor 104 and ground is a series resistance capacitance network consisting of resistor 106 and capacitor 108. Connected between the drain terminal of field-effect transistor 104 and ground is a plurality of capacitors 110, 112, 114, 116 and 118 through switches 111, 113, 115, 117 and 119, respectively. In parallel with these capacitors are series RC circuits through switches 120 and 122. The gate terminal of transistor 104 is connected to a source of voltage $+V_1$ and also through a normally open switch 124 which is activated by a cam 126 which is part of the scan speed drive mechanism that rotates prism 27 within monochromator 12.

The circuit of FIG. 3 is essentially an R-C circuit operational amplifier relaxation oscillator with a manually selectable capacitance and an error voltage selectable resistance. The scan speed is selected by activating any of the switches 111, etc., to place in parallel any one or more capacitors to thereby vary the capacitance overall and thus select a scan speed. The plurality of capacitors in parallel can be selected to provide a wide dynamic range of operating speed for wavelength scanning. The output is a train of pulses appearing at the output of amplifier 94 at leads 130.

In normal operation, that is, with zero error signal, the field-effect transistor 87 is biased "full on," thereby effectively rendering a shunt path across resistor 88. The transistor 87 is a junction field-effect transistor which is bidirectionally conductive, the conductivity being determined by the gate electrode terminal voltage. The net effect is a voltage-controlled variable resistance in parallel with resistor 88. Briefly, the order of magnitude of resistance 88 determines the slow speed of the pulse train output when the field-effect transistor 87 is nonconductive, while the resistive value of resistance 90 determines the fast speed within a selected scan speed range when the transistor 87 is fully conductive. For example, resistor 88 is in the order of magnitude of 300,000 ohms while resistor 90 is in the order of magnitude of 1,000 ohms.

The operational amplifier 94 is a high speed differential comparator biased as a relaxation oscillator. The capacitance of the frequency determining circuit of the multivibrator is switch selected by depressing any one of the switches 111, etc., while the resistance value of the RC circuit is determined by resistor 90 and by the conductivity of transistor 87 in parallel with resistor 88. Thus, voltage control capability is achieved by connecting a junction field-effect transistor 87 in parallel with a portion of the resistance of the frequency determining circuit, making the total resistance a function of the gate voltage on the field-effect transistor.

Resistors 98 and 100 provide a threshold voltage level for the noninverting input of amplifier 94 while resistor 96 provides a feedback loop between this input and the output.

Thus, it can be seen with a given selection of scan speed by activation of any of the switches 111, etc., a speed range is determined with control within the range determined by the error voltage appearing at inputs 84 to the transistor 87. The transistor 104 is normally biased to conduction.

The wavelength scan in a spectrophotometer is usually controlled in conjunction with a wavelength cam coupled to the prism. A second cam 126 is utilized and rotates with the wavelength cam, which may be shaped for three order changes, for example. The second cam 126 is suitably detented, as at portion 127 to coincide with the order changes. When the cam 126 which is coupled to the drive of the prism 27 reaches the portion 127 of the cam edge where it is desirable to increase the wavelength scan speed to maximum, the cam follower switch arm of switch 124 is activated, thereby driving the gate of transistor 104 to ground resulting in transistor 104 becoming nonconductive and thereby disconnecting all the switch selectable capacitors. At this point capacitor 108 in series with resistor 106 determines the RC time constant of the relaxation oscillator circuit driving the clock output 130 at maximum frequency to accelerate the wavelength scan speed. The circuit of FIG. 3 thus results in a voltage variable clock for a speed suppression system using stepper motors.

The wavelength dividers 44 and chart dividers 46 are conventional frequency dividers switch selected to predetermined divider formats.

Although the wavelength divider 44 output is shown as being coupled to the chart dividers 46, it is also possible to couple the chart divider 46 to the output of the voltage controlled oscillator 42 to provide the flexibility required depending upon whether the chart is moving or the chart is stationary with the pen scanning the chart. In any event, while there has been shown and described a preferred embodiment, it is to be understood that various other adaptations and modifications may be made within the spirit and scope of the invention.

We claim:

1. In a radiant energy analyzer having a radiant energy source, reference and sample radiant energy beam paths, a monochromator and a wavelength scanning mechanism therefor, means generating an error signal which varies as a function of the difference in the intensity in the reference and sample beam paths, attenuator means responsive to the error signal to balance the energy in the beams, the improvement comprising:
   a first stepper motor for driving the wavelength scanning mechanism to continuously vary the wavelength output of the monochromator;
   an oscillator having a pulse train output of predetermined frequency coupled to drive the first stepper motor, and hence the wavelength scanning mechanism, at a predetermined scan speed;
   means responsive to changes in the error signal for varying the frequency of the pulses applied to the stepper motor, whereby the scan speed of the wavelength scanning mechanism is decreased or increased for a corresponding increase or decrease in the error signal to improve the tracking accuracy between the wavelength scanning mechanism and the attenuator means;
   chart recording means for recording a radiant energy parameter of the sample and a second stepper motor for driving the chart recording means along an axis thereof, the pulse train output of the oscillator being coupled to drive both the first and second stepper motors in a fixed speed relationshp at speeds proportional to the output frequency of the oscillator; and
   first and second variable frequency dividers and means coupling the oscillator pulse train output through said first variable frequency divider to the first stepper motor and through a series connection of said first and second variable frequency dividers to the second stepper motor.

2. The analyzer of claim 1 wherein the oscillator is a signal controlled, variable frequency oscillator and the means responsive includes means coupling the error signal as a control input signal to the variable frequency oscillator, whereby the pulse train output frequency of the oscillator, and hence the scan speed of the wavelength scanning mechanism and the speed of the chart recording means, is varied in response to changes in the error signal.

3. In a radiant energy analyzer having a radiant energy source, reference and sample radiant energy beam paths, a monochromator and a wavelength scanning mechanism therefor, chart recording means for recording a radiant energy parameter of a sample, electrical signal generating means generating a d.c. error signal having an amplitude varying as a function of the difference in the intensity in the reference and sample beam paths and a polarity indicative of the relative direction thereof, attenuator servo loop means responsive to said error signal to balance the energy in said beams, the improvement comprising:
   a first stepper motor for driving said wavelength scanning mechanism to continuously vary the wavelength output of said monochromator;
   a second stepper motor for driving said chart recording means along an axis thereof;
   a variable frequency oscillator having a pulse train output coupled to drive both said first and second stepper motors in a fixed speed relationship at speeds proportional to the output frequency of said oscillator;
   circuit means responsive to said error signal for generating a control signal proportional to the absolute value of said error signal, said circuit means including a capacitor across which said control signal is established and means for rapidly charging said capacitor responsive to the existence of said error signal and for slowly discharging said capacitor in the absence of said error signal; and
   means coupling said control signal to said variable frequency oscillator in response to changes in said error signal whereby the speeds of the first and second stepper motors are decreased or increased for a corresponding increase or decrease in said error signal.

4. The analyzer of claim 3 wherein said means for rapidly charging and slowly discharging said capacitor includes:
   first and second operational amplifiers each having inverting and non-inverting input terminals and an output terminal;
   means for coupling the error signal to the non-inverting input terminal of the first amplifier and to the inverting input terminal of the second amplifier;
   first and second diodes coupling the respective output terminals of the first and second amplifiers to a first terminal of said capacitor, the first and second diodes completing respective first and second charge paths between the first and second amplifiers and the first terminal of said capacitor for charging said capacitor in response to the error signal;
   the first and second diodes being poled in the same direction between the amplifier associated with each and the first terminal of said capacitor, whereby error signals of a first polarity are translated exclusively by the first amplifier and associated diode and error signals of the opposite polarity are inverted and translated exclusively by the second amplifier and associated diode to thereby develop the control signal across said capacitor proportional to the absolute value of the error signal; and
   a resistor coupled between the first terminal of the capacitor and the inverting input terminal of the second amplifier to provide a discharge path for said capacitor.

* * * * *